R. A. KRAMER.
THREAD CUTTER.
APPLICATION FILED JUNE 7, 1910.
1,049,874.
Patented Jan. 7, 1913.
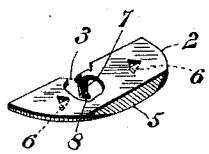
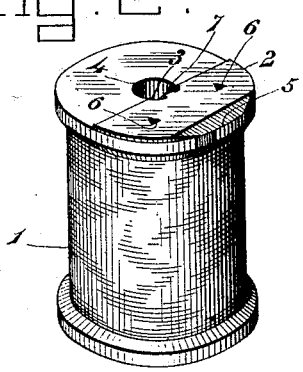
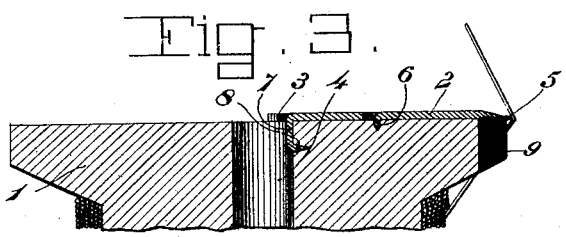
Inventor
Rufus A. Kramer
By Victor J. Evans
Attorney
Witnesses

UNITED STATES PATENT OFFICE.

RUFUS A. KRAMER, OF EASTBANK, WEST VIRGINIA.

THREAD-CUTTER.

1,049,874.     Specification of Letters Patent.      Patented Jan. 7, 1913.

Application filed June 7, 1910. Serial No. 565,484.

*To all whom it may concern:*

Be it known that I, RUFUS A. KRAMER, a citizen of the United States, residing at Eastbank, in the county of Kanawha and State of West Virginia, have invented new and useful Improvements in Thread-Cutters, of which the following is a specification.

This invention relates to thread cutting attachments for spools and the object of the invention is to provide a simple and inexpensive attachment which may be readily applied to the ordinary spool of thread whereby the thread may be severed without the use of shears.

Further objects of the invention will appear as the following specific description is read in connection with the accompanying drawing which forms a part of this specification, and in which:

Figure 1 is a perspective view of the attachment removed from the spool. Fig. 2 is a perspective view of the device applied to the spool. Fig. 3 is a longitudinal vertical sectional view through the spool and the attachment therefor.

Referring more particularly to the drawing 1 represents the ordinary spool and 2 the attachment which comprises a semi-circular plate of suitable metal having a semi-circular notch 3 cut in its rear side to register with the central hole 4 running through the spool. The forward curved edge is sharpened as at 5 and the body of the plate has punched up therefrom the engaging tongues 6 which are adapted to enter the end of the spool as shown in Fig. 3. Depending from the wall of the notch 3 is an arm 7 having an inwardly turned prong 8. This arm is preferably stamped up from the metal and enters the hole 4 and has its prong 8 pressed into engagement with the body of the spool. The sharpened edge 5 preferably overhangs the usual notch 9 which is formed in the spool and the semi-circular edge conforms when the device is in position to the end of the spool.

In the application of the device, the arm is inserted within the hole until the rear edge of the plate lies upon the end of the spool. The prong 8 is then forced into the body of the spool and the plate pressed downwardly upon the end thereof so as to force the projections 6 into the end of the spool. In this position the sharpened edge 5 overlies the notch 9 and by forcing the thread into the notch, it is brought into contact with the cutting edge and thereby severed.

Having thus described the invention, what is claimed is—

The combination with a spool, of a thread cutting attachment adapted to be secured upon the end thereof, said attachment comprising a sheet metal plate of substantially semi-circular shape having a semi-circular notch to conform to the hole in the spool, a dependable arm formed upon the plate in the said notch and having a laterally projecting prong adapted to be inserted in the wall of the spool opening to prevent upward movement of the attachment, the said plate being stamped down to provide prongs adapted to enter the ends of the spool to prevent lateral movement of the attachment, and a cutting edge formed on the plate opposite the notch therein for the purpose set forth.

In testimony whereof I affix my signature in presence of two witnesses.

RUFUS A. KRAMER.

Witnesses:
  J. M. McCONIHAY,
  ROBERT McCONIHAY.

---

Copies of this patent may be obtained for five cents each, by addressing the "Commissioner of Patents, Washington, D. C."